May 30, 1961     E. GOLDBERG     2,986,269
PACKAGE FOR TEA OR OTHER INFUSION COMMODITIES
Filed Nov. 9, 1959

INVENTOR.
ERNEST GOLDBERG
BY W. J. Collins
ATTORNEY

United States Patent Office 2,986,269
Patented May 30, 1961

2,986,269
PACKAGE FOR TEA OR OTHER INFUSION COMMODITIES
Ernest Goldberg, 108 Shelmore Road, Mount Holly, N.J.
Filed Nov. 9, 1959, Ser. No. 851,667
11 Claims. (Cl. 206—.5)

This invention relates to the art of deriving rich and full-flavored liquids from infusion commodities such as tea leaves, and particularly is directed to a new and improved arrangement for more efficiently extracting the flavor from such commodities in an esthetically pleasing manner.

Tea bags, both of conventional and "flow-through" design, are now quite widely used both in the home and in restaurants. Such bags have been and are marketed in various sizes depending upon the situation, i.e., small tea bags for brewing individual cups of tea and larger or family-size tea bags for brewing in the pot. While tea leaves presently are the principal and best known infusion commodity, other such commodities, such as ingredients for the preparation of soup broths, herbs, etc., are expected to achieve increasing prominence. Particularly this is so where the consumer public has manifested a strong interest in ready-mixed foods and drinks which require little or no effort in preparation.

Notwithstanding the natural appeal of such items and substantial public acceptance thereof, there are certain disadvantages associated with products now on the market which have discouraged many users or potential users of the products. These disadvantages, selecting tea as a typical example, include ineffectiveness in fully extracting the available flavor from the tea leaves, inadvertent squirting or dripping of the liquid on one's clothing or on the tablecloth during the extraction process, creation of a pool of liquid on the saucer which seeps under the cup and then proceeds to drip when the cup is lifted, and the general unsightly appearance of a soggy and discolored tea bag.

In the past attempts have been made to obviate the foregoing disadvantages, but such attempts have been only partially successful or prohibitively expensive from the marketing standpoint.

Accordingly, one of the principal objects of this invention is to provide a new and improved arrangement for more efficiently extracting the available flavor from infusion type commodities.

Another object of the invention is to provide a new and improved infusion type package which is simple and inexpensive to manufacture.

A further object of the invention is to provide a new and improved article of the type referred to which, after use, remains attractive and pleasing to the eye.

The foregoing and other objects and advantages of the instant invention are achieved in the following manner. A water pervious bag, of conventional or "flow-through" type design, is provided which contains the infusion commodity. A flexible cord encircles the bag and is slidably attached thereto in such a manner that a central pulling force may be exerted on the bag without the cord slipping from the bag. One or both ends of the cord extends through the bottom of a hollow cone, emerges through a small opening at the apex of the cone (which is approximately the diameter of the cord), and the end or ends of the cord is attached to a tab or other convenient means by which a pulling pressure may be exerted on the bag.

The invention will be described in detail with reference to the accompanying drawings in which.

Like reference characters are applied to like elements throughout the drawings.

Figure 1:
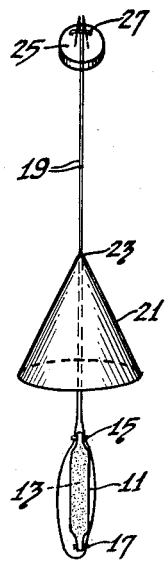
Figure 1 shows a side view of one embodiment of the invention comprising an infusion package in which a cone and associated cord arrangement are employed for extracting the flavor from infusion commodities.
Figure 1:
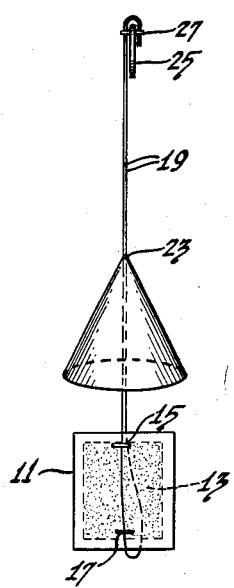
Figure 1:
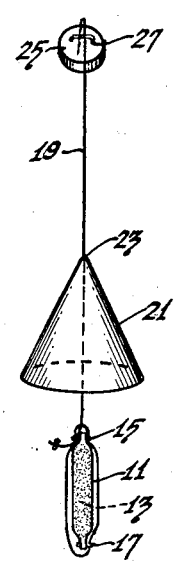
Figure 1:
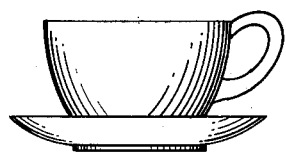
Figure 2:
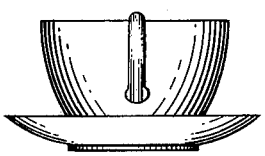
Figure 2 is a front view of the embodiment of Figure 1.

Referring to Figures 1 and 2, a typical embodiment of the invention is shown in which a bag 11 pervious to water contains an infusion commodity 13 such as tea leaves. The bag 11 has guides 15 and 17 affixed near its upper and lower edges. The guides 15 and 17 may be simply wire staples or any equivalent structure for performing the function hereinafter described. A flexible cord 19, such as string, is provided which loops about the bag 11. The cord 19, on the right side of the bag 11, is enclosed by both guides 15 and 17 and is slidable thereunder. On the left side of the bag 11 the cord 19 is slidably enclosed only by the guide 15 located near the upper edge of the bag.

The two free ends of the cord 15 extend through the bottom of a hollow cone 21, pass through a small opening 23 at the apex of the cone, and both ends are secured to a tab 25 by any convenient means such as a staple 27, which in this embodiment encloses the cord 19 on both sides of the pull tab 25.

The cone 21 may be fabricated from substantially any desired flexible material such as heavy paper, flexible cardboard, certain plastic materials, aluminum coated paper, or a combination of the foregoing. The cone 21 should be sufficiently large that it will fully enclose the bag 11 when used in the manner to be described, and as many layers of cone material may be used as is necessary for insulation purposes. Also, the opening 23 at the apex of the cone is made quite small so that liquid will not pass therethrough. Preferably the opening is made only large enough to permit the cord 19 to pass therethrough.

Figure 3:
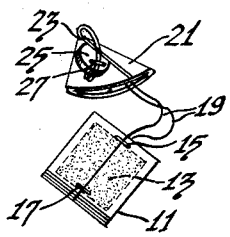
Figure 3 is another view of the embodiment of Figures 1 and 2 in which the cone is folded flat to serve as an envelope to contain the infusion package and the pull tab is secured in a pocket of the cone formed by an overlap of the cone material.

The package or arrangement described above is used in the following manner. The bag 11 is removed from the cone 21, which in collapsed form serves as an envelope for the bag (see Figure 3), and is placed in a cup or pot of hot liquid such as water. The bag 11 is allowed to remain in the liquid for several minutes during which the infusion process takes place. The cone 21 is then grasped firmly in one hand and lifted, thereby removing the bag 11 from the liquid and suspending it over the cup. The tab 25 is grasped in the other hand and pulled with the result that the cord 19 slides through the guides 15 and 17, through the opening 23 at the apex of the cone 21, and causes the bag 11 to be wedged within the cone 21 near the apex. By the combined action of pulling the tab 25 with the one hand and squeezing the cone 21 with the other hand, the bag 11 is firmly compressed and substantially all the available flavor and liquid is extracted from the tea leaves and deposited in the cup.

Figure 4:
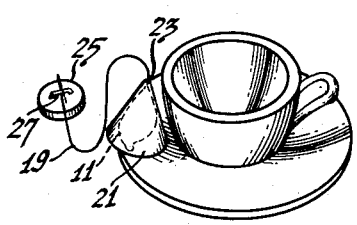
Figure 4 shows the assembly after use with the compressed infusion package firmly wedged within the cone.

The conical design proposed in accordance with the invention has the important advantage that the forces applied to the tea bag during the "squeezing" process all are in an inwardly and downwardly direction. This means that the flavor is extracted from the tea leaves (or other commodity) much more efficiently than heretofore, that there can be no shifting of the liquid from one part of the bag to another with the result that small pockets of liquid will not form and later drip, and that the liquid cannot inadvertently be squirted sideways. The arrangement described has the further advantage that the used bag is wedged quite firmly within the cone. As a result, the cone, which may have colorful and interesting advertising or other subject matter displayed on its outer surface, may be allowed to remain, open end down, on the edge of the saucer as shown in Figure 4. The bag will remain in the cone near the apex, the bag not drip, and the used package remains attractive and pleasing to the eye.

In addition, by locating guides for the cord 19 near both the upper and lower edges of the bag 11, the cord cannot slip from the bag and excellent consistency of results is obtained in compressing the bag 11 and the commodity contained therein. Moreover, since the lower guide 17 encloses the cord 19 on only one side of the bag 11, free expansion and compression of "flow-through" as well as conventional type bags containing infusion commodities is afforded. This arrangement is also equally effective with the large size family type tea bags for brewing in the pot.

Figure 5:
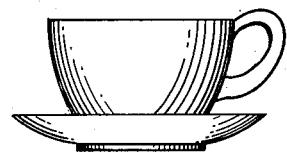
Figure 5 shows a second embodiment of the invention utilizing a cord arrangement different from that shown in Figure 1.

In Figure 5 another embodiment of the invention is shown which is similar in some respects to that described with reference to Figure 1, except that in this instance a different cord arrangement is set forth for exerting the required pressure for wedging the bag 11 within the cone 21. In Figure 5 the cord 19, near one of its free ends, is secured under the guide 15 both on the left and right sides of the bag. The remaining portion of the cord extends along the right side of the bag passing under the lower guide 17, loops around the bottom of the bag 11, extends up the left side of the bag under the guide 15 near the upper end of the bag, and then the remaining free end of the cord 19 passes through the cone 21 and is secured to the tab 25 or other pull means. The first-mentioned free end of the cord 19, to avoid being pulled loose if tugged unusually hard, may be either knotted or looped back upon itself.

Certain modifications of the above embodiments of the invention obviously may be made without departing from the scope of the invention. Accordingly, the subject matter heretofore described and shown should be interpreted as illustrative only and not in a limiting sense.

What is claimed is:

1. An infusion commodity arrangement comprising, a liquid pervious bag containing an infusion commodity, a flexible hollow cone having a small aperture at its apex, and a flexible cord looped about said bag and slidably secured to opposed ends of said bag, at least one free end of said cord extending through the base of said hollow cone and said aperture so that when said free end is subjected to a pulling force said bag is drawn within and against the inner surface of said cone.

2. An infusion commodity arrangement comprising, a liquid pervious bag containing an infusion commodity, a flexible hollow cone having a small aperture at its apex, said cone being formed of a material which is thermally insulating, a flexible cord looped about said bag and slidably secured to opposed ends of said bag, at least one free end of said cord extending through the base of said hollow cone and said aperture so that when said free end is subjected to a pulling force said bag is drawn within and against the inner surface of said cone.

3. An infusion commodity arrangement comprising, a liquid pervious bag containing an infusion commodity, a flexible hollow cone having a small aperture at its apex, said cone being formed from a material which is thermally insulating, a flexible cord looped about said bag and slidably secured to opposed ends of said bag, at least one free end of said cord extending through the base of said hollow cone and said aperture so that when said free end is subjected to a pulling force said bag is drawn within and against the inner surface of said cone, and pull means at said free end of said cord.

4. An arrangement as claimed in claim 3 wherein the diameter of said aperture is approximately equal to the diameter of the cord passing therethrough.

5. An arrangement as claimed in claim 3 wherein said hollow cone encloses and obscures from view said bag when a force is exerted upon said pull means.

6. An arrangement as claimed in claim 3 wherein an overlap of the cone material along a lateral edge of said cone forms a pocket for containing said pull means.

7. An arrangement as claimed in claim 3 wherein said hollow cone when folded flat serves as an envelope to contain said bag.

8. An arrangement as claimed in claim 3 wherein said pull means comprises a tab and said cord is secured to both sides of said tab.

9. An infusion commodity arrangement comprising, a liquid pervious bag containing an infusion commodity, a flexible hollow cone having a small aperture at its apex, a flexible cord looped about said bag with both free ends of said cord extending through the base of said hollow cone and said aperture, means located at the end of said bag nearest to the free ends of said cord for slidably securing said cord to opposing sides of said bag, means located at the other end of said bag for slidably securing the said cord to only one side of said bag, and pull means at the free ends of said cord.

10. An infusion commodity arrangement comprising, a liquid pervious bag containing an infusion commodity, a flexible hollow cone having a small aperture at its apex, a flexible cord looped about said bag with one free end adjacent one end of said bag and the other free end extending beyond said one end of said bag, means near said one end of said bag for slidably securing said cord to opposing sides of said bag including the first said free end, means located at the other end of said bag for slidably securing said cord to only one side of said bag, and pull means at the end of said other end of said cord.

11. An arrangement as claimed in claim 10 including means at said one free end of said cord preventing said end from sliding through said first-named securing means.

References Cited in the file of this patent

UNITED STATES PATENTS

| | | |
|---|---|---|
| 2,227,934 | Hofmann | Jan. 7, 1941 |
| 2,308,241 | Hogaboom | Jan. 12, 1943 |
| 2,800,408 | Fimple | July 23, 1957 |
| 2,860,989 | Geisinger | Nov. 14, 1958 |